July 28, 1936.  D. L. SHOWALTER  2,048,955
CRIB APPLIANCE FOR VEHICLES
Filed June 27, 1934
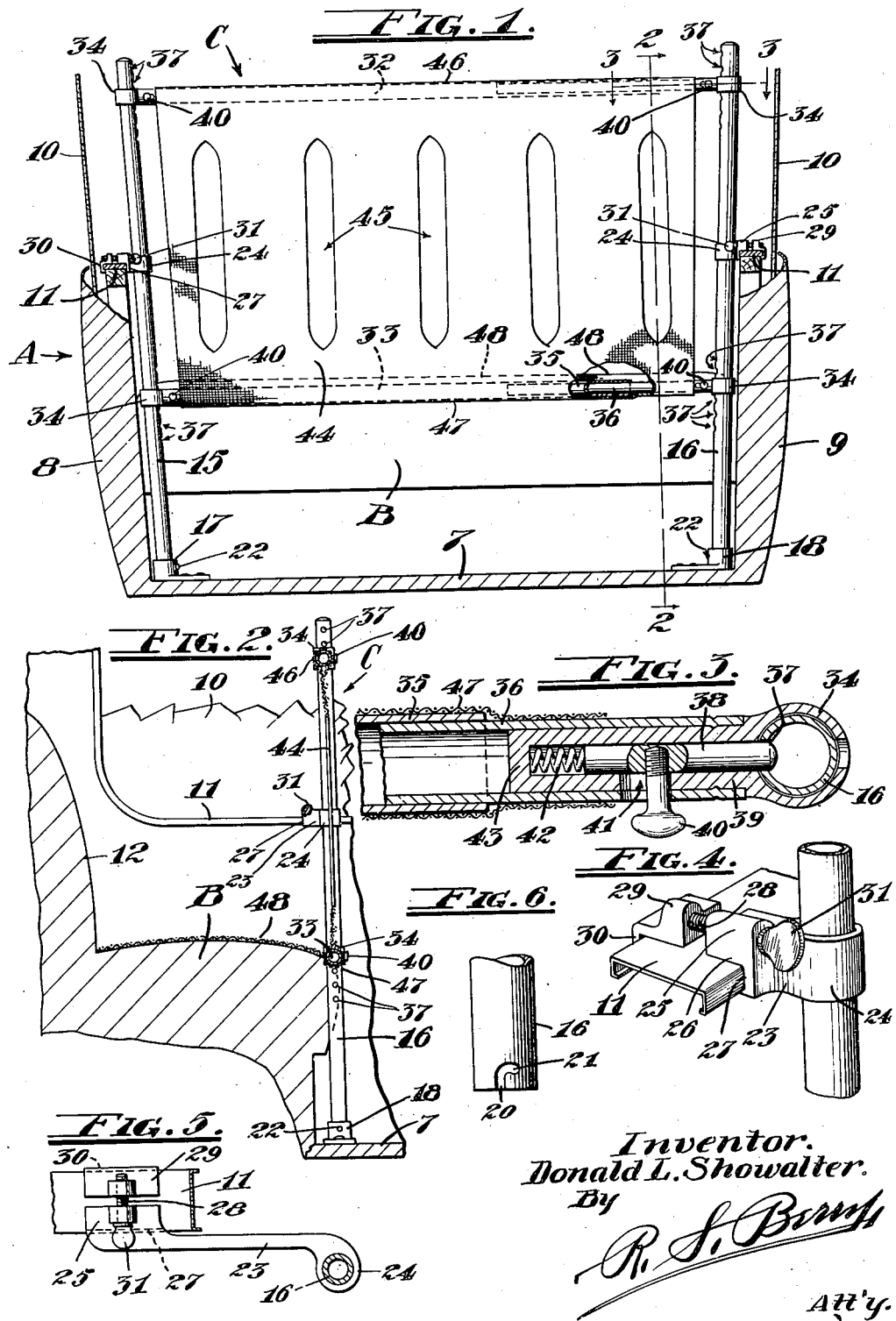
Inventor.
Donald L. Showalter.
By
R. S. Berry
Att'y.

Patented July 28, 1936

2,048,955

UNITED STATES PATENT OFFICE 2,048,955

CRIB APPLIANCE FOR VEHICLES

Donald L. Showalter, Huntington Park, Calif.

Application June 27, 1934, Serial No. 732,635

11 Claims. (Cl. 5—94)

This invention relates to an appliance for vehicles to convert a vehicle seat into a crib, and has as its primary object the provision of a wall structure adapted to be demountably erected to extend in front of a vehicle seat to extend upwardly from the forward edge thereof to form a closure across the front of the seat whereby the latter may be utilized as a crib or bed.

Another object is to provide a structure of the above character which is especially applicable for use in connection with a seat of automobile and especially with the rear seats of automobiles of the enclosed type.

Another object is to provide a crib forming structure which is adjustable to accommodate it to vehicles and vehicle seats of various dimensions.

Another object is to provide a structure of the above character which is composed of a plurality of separable elements adapted to be disposed in a compact bundle when not in use, and which may be readily assembled and applied to a vehicle and easily removed therefrom.

Another object is to provide a wall structure for the purpose specified which is light in weight, and of substantial construction and when applied will produce a strong structure not liable to be accidentally displaced by the ordinary strains to which it might be subjected.

With the foregoing objects in view, together with such other objects and advantages as may subsequently appear, the invention resides in the parts and in the combination, construction and arrangement of parts hereinafter described and claimed, and illustrated by way of example in the accompanying drawing in which:

Fig. 1 is a view of the structure as seen in front elevation showing it as applied in connection with the rear seat of an automobile:

Fig. 2 is a view in section and elevation taken on the line 2—2 of Fig. 1 as seen in the direction as indicated by the arrows:

Fig. 3 is a detail in horizontal section taken on the line 3—3 of Fig. 1:

Fig. 4 is a detail in perspective illustrating a clamp for effecting engagement of a standard with a window sill of the vehicle:

Fig. 5 is a plan view illustrating a modified form of the clamp shown in Fig. 4:

Fig. 6 is a detail in elevation of the lower portion of a standard.

Referring to the drawing more specifically A indicates generally a fragmentary portion of a compartment of an automobile or other vehicle which compartment embodies a floor 7 and side walls 8 and 9 each of which is fitted with a window 10 having a sill 11.

The compartment is equipped with the usual cushion B which extends between the side walls 8 and 9 and is fitted with a cushion back 12 in the usual manner.

The present invention resides in a wall structure C adapted to be mounted in the vehicle compartment A to extend above the seat B at the forward edge of the latter.

As here shown the wall structure embodies a pair of tubular standards 15 and 16 which are designed to extend upwardly alongside the inner faces of the side walls 8 and 9 in front of and adjacent to the ends of the seat B with the lower ends of the columns demountably seated in and engaged with socket members 17 and 18 affixed to the floor 7; the lower end of each of the standards being formed with an upwardly extending open ended slot 20 terminating in a downwardly curved end portion 21 for effecting engagement with a pin 22 in the socket member whereby a bayonet joint connection is afforded between the standard and the sockets such as to securely hold the standard against being lifted from the socket inadvertently, but which will permit ready detachment and reattachment of the standards relative to the sockets.

Connecting with each of the standards intermediate its ends is a bracket 23 particularly shown in Figs. 4 and 5, which bracket may be of any suitable length, it being shown quite short in Fig. 4 and as considerably elongated in Fig. 5; the brackets being provided of such length as to accommodate them to the dimensions of a particular vehicle to which they are to be applied.

The outer end of the bracket 23 is formed with a sleeve 24 which slidably telescopes the standard and is adapted to be shifted to various positions longitudinally thereof and to be readily removed therefrom.

The other end of the bracket 23 is formed with a clamp member 25 adapted to seat upon the window ledge 11 and also to bear against the inner margins thereof and for which purpose the under side of the clamp member 25 is formed with walls 26 and 27 extending at right angles to each other with the wall 26 disposed to seat on the top of the sill 11 and the wall 27 to abut against the inner edge of the sill, as particularly shown in Fig. 4.

Revolubly carried by the clamp member 25 is a screw 28 having threaded engagement with a clamp member 29 formed to seat on the sill 13 and having a downturned flange 30 engageable with the outer edge of the sill. The screw 28 is formed with a head 31 whereby it may be readily rotated to adjust the clamp members 25 and 29 relative to each other in effecting their engagement or disengagement with the sill 13.

A pair of horizontal rails 32 and 33 are provided to extend between the standards 15 and 16 in superposed relation to each other; the rail 32 constituting a top rail and connecting the upper portions of the standards, while the rail 33 connects the intermediate portion of the standards adjacent the forward edge of the seat B. The ends of the rails 32 and 33 are formed with sleeves 34 as particularly shown in Fig. 3 which sleeves slidably encircle the standards and are adjustable to various positions longitudinally thereof and are adapted to be removed therefrom.

In order to accommodate the rails 32 and 33 to different lengths of spacing between the standards 15 and 16, each of the rails is formed of telescoping sections 35 and 36 on the outer ends of which the sleeves 34 are carried.

As a means for enabling attachment of the sleeves 34 to the standards at various points throughout the lengths of the latter, the standards are formed with a series of spaced openings 37 adapted to be engaged by spring pressed bolts 38 here shown as mounted in tubular stems 39 formed on the sleeves 34, which stems extend into the ends of the rail sections 35 and 36 as particularly shown in Fig. 3. The bolts 38 are formed with handles 40 projecting through slots 41 in the stems 39 and rail sections whereby the bolts may be retracted manually in opposition to springs 42 bearing between the inner ends of the bolts and end walls 43 on the tubular stems 39.

Extending between the rails 32 and 33, and carried thereby, is a flexible wall 44 formed of canvas or similar fabric which may be provided with openings or slots 45 for ventilation purposes; the wall 44 being formed with sleeves 46 and 47 at its upper and lower margins through which the rails 32 and 33 slidably extend. An apron 48 connects with the lower margin of the wall 44 and is adapted to be extended over the seat B, and when so disposed forms a closure at the juncture of the bottom rail 33 with the forward edge of the seat B such as to prevent small articles from rolling off the seat or being forced beneath the lower rail 33.

In the application and operation of the invention, to assemble the structure the sleeves 34 on the bottom rail 33 are first engaged with the standards 15 and 16 whereupon the sleeves 24 on the brackets 23 are positioned on the standards, and then the sleeves 34 on the upper rail 32 are engaged with the standards, which assemblage may be done either before or after the lower ends of the standards are inserted in the sockets 17 and 18 and engaged by the pins 22 of the latter.

In most instances, however, it is desirable to first assemble the standards in their upright position in the sockets 17 and 18 and thereafter apply the rails and brackets. The rails 32 and 33 are initially disposed at any convenient points in the length of the standards, whereupon the brackets 23 are secured to the sill 11 by the clamp members 25 and 29 through the medium of the screws 28, thus securely supporting the standards in their upright position. Where the standards extend in front of the window 10 as shown in Fig. 2, a bracket 23 of short length may be employed as shown in Fig. 4, but where the vehicle is so constructed that the window is to either side of the standard then an elongated bracket is employed as shown in Fig. 5 to extend between the standard and the window sill.

After securely fastening the standards in their upright position, the rails 32 and 33 are disposed with the rail 33 abutting against or spaced slightly from the forward upper edge of the seat B with the ends of the rail 33 connected to the standards by the bolts 38 as before described, whereupon the upper rail 32 is engaged with the standards at such points as will preferably stretch the flexible wall 44 and draw it taut.

The apron 48 may then be positioned to extend over the top of the seat B as shown in Fig. 2, if so desired.

In thus mounting the wall structure C the standards are preferably positioned so that they may be pressed into the outer edge of the seat B which is yieldable since such seats are ordinarily in the form of cushions, and the lower rail 33 is likewise pressed into the seat thus making a tight connection with the forward upper edge of the seat and the wall structure.

In forming the standards with the openings 37 the latter are arranged relative to the slots 20 and 21 so that when the end portions 21 of the slots are engaged with the pins 22 in the sockets 17 and 18 the openings 37 will be disposed to be engaged by the bolts 38 and when so engaged the standards will be locked against turning and thus will be securely held against withdrawal from the sockets 17 and 18 while the structure is assembled.

The manner of demounting the structure is obvious. It will be seen that when the structure is demounted the standards and the brackets may be positioned between the rails 32 and 33 and the fabric of the flexible walls 44 wrapped therearound thus assembling the parts in a compact bundle for transportation or for packing away when not in use.

Manifestly where desired the upper rail 32 need not be disposed in its uppermost position and may be lowered to an intermediate position to rest on the sleeve 24 of the bracket 23 where a lower wall is desired; the flexible wall 44 being then folded either to hang downward in front of the seat B or to overlie on top of the latter. In some instances where it is not desired to demount the standards 15 and 16, but to take down the wall C, the upper rail 32 may be detached from the standards and the flexible wall 44 either folded back over the top of the seat B or extended downwardly in front of the seat.

When erected, the wall structure will convert the seat B into a crib which is especially suitable for use to accommodate infants or small children, and particularly as a bed, in which latter instance suitable bedding is applied over the seat B. However it is manifest that the space back of the wall C may be employed to confine packages or bundles and for various other purposes.

While I have shown and described a specific embodiment of my invention I do not limit myself to the exact details of construction and arrangement shown, but may employ such changes and modifications as occasion may require coming within the meaning and scope of the appended claims.

I claim:
1. A crib attachment for vehicles comprising a pair of standards, means for demountably attaching said standards adjacent the ends of a vehicle seat, a wall structure carried by said standards and extending therebetween and projecting upwardly from the forward margin of the seat, and means for fastening said wall structure at various heights on said standards.

2. A crib appliance for vehicle seats comprising a pair of standards, means for detachably mounting said standards adjacent the ends of a vehicle seat, a pair of spaced rails carried by said standards arranged with one of the rails extending adjacent the forward edge of the seat and with the other rail spaced thereabove, means for fastening said rails independently of each other at various points on said standards, and a flexible wall connecting said rails adapted to be drawn taut by adjusting said rails relative to each other.

3. A crib appliance for vehicle seats comprising a pair of standards, means for mounting said standards adjacent the ends and front edge of a vehicle seat, a pair of vertically spaced horizontal rails extending between and carried by said standards and adjustable longitudinally thereof independent of each other, and a flexible wall carried by and extending between said rails.

4. A crib appliance for vehicle seats comprising a pair of standards, means for mounting said standards adjacent the ends and front edge of a vehicle seat, a pair of longitudinally adjustable vertically spaced horizontal rails extending between and carried by said standards and relatively adjustable vertically thereon, and a flexible wall carried by and extending between said rails.

5. A crib appliance for vehicle seats comprising a pair of standards, means for detachably connecting the lower ends of said standards to a vehicle floor, means for detachably connecting the upper portion of the standards in relation to the side walls of the vehicle, a pair of side rails extending between and carried by said standards, said rails being spaced apart on said standards, and a flexible wall extending between and carried by said rails.

6. In a crib attachment for vehicles, a pair of vertically spaced rails, means for supporting said rails, a flexible wall connecting said rails, means for mounting said supporting means adjacent the front edge of a vehicle seat, and a flexible apron connecting with said flexible wall at the lowermost of said rails adapted to be extended over the seat.

7. In a crib appliance for vehicle seats, a pair of rails each of which is formed of telescoping members, sleeves at the ends of said rails, standards encircled by said sleeves, means for detachably engaging said sleeves to said standards at various points throughout the lengths thereof, and a flexible wall extending between and carried by said rails.

8. In a crib appliance for vehicle seats, a pair of rails each of which is formed of telescoping members, sleeves at the ends of said rails, standards encircled by said sleeves, means for detachably engaging said sleeves to said standards at various points throughout the lengths thereof, a flexible wall extending between and carried by said rails, sockets receiving the lower ends of said standards, and bayonet joints connecting said standards to said sockets, said fastening means between said rails and standards holding said standards against turning relative to said sockets.

9. In a crib attachment for vehicles, a pair of standards, means for attaching the lower ends of said standards to a vehicle floor, brackets engaging the intermediate portions of said standards, means for attaching said brackets relative to the side walls of the vehicle, and a wall demountably carried by said standards adapted to extend upwardly from the forward edges of a vehicle seat.

10. In a crib attachment for vehicles having a seat, side walls at the ends of the seat, and window sills in said side walls; a pair of standards arranged adjacent the ends of the seat, means for supporting the lower ends of said standards, means connecting said standards intermediate their ends to said window sills with the upper end portions of said standards protruding above said sills, a pair of rails extending between and carried by said standards on opposite sides of said sill connections, and a wall extending between and carried by said rails.

11. In a crib attachment for vehicles having a seat, side walls at the ends of the seat, and window sills in said side walls; a pair of standards arranged adjacent the ends of the seat, means for supporting the lower ends of said standards, means connecting said standards intermediate their ends to said window sills with the upper end portions of said standards protruding above said sills, a pair of rails extending between and carried by said standards on opposite sides of said sill connections, a wall extending between and carried by said rails, and means for detachably connecting said side rails independently of each other at various points on said standards.

DONALD L. SHOWALTER.